W. B. FURMAN.
PNEUMATIC RIVET PASSING APPARATUS.
APPLICATION FILED AUG. 29, 1919.
1,385,820.
Patented July 26, 1921.
3 SHEETS—SHEET 1.
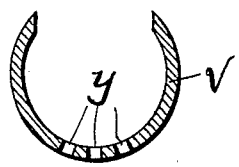
FIG. 3.
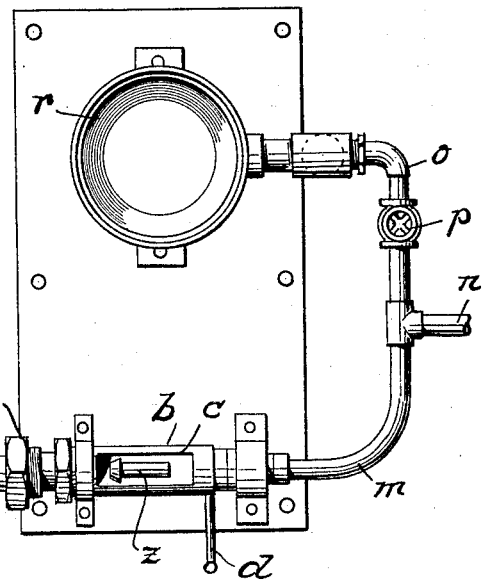
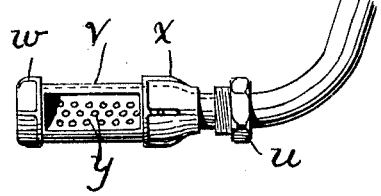
FIG. 1.
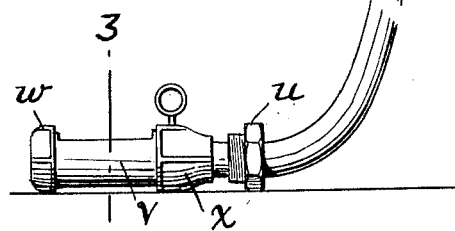
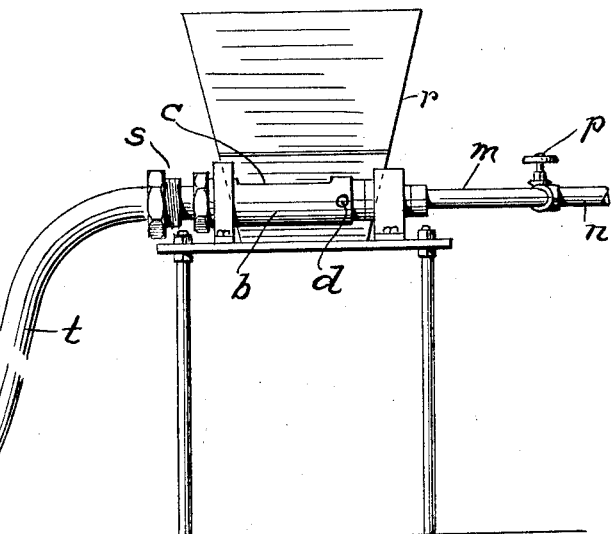
FIG. 2.
WITNESS:
Rob't R. Kitchel
INVENTOR
William B. Furman
BY
Frank D. Busan
ATTORNEY.

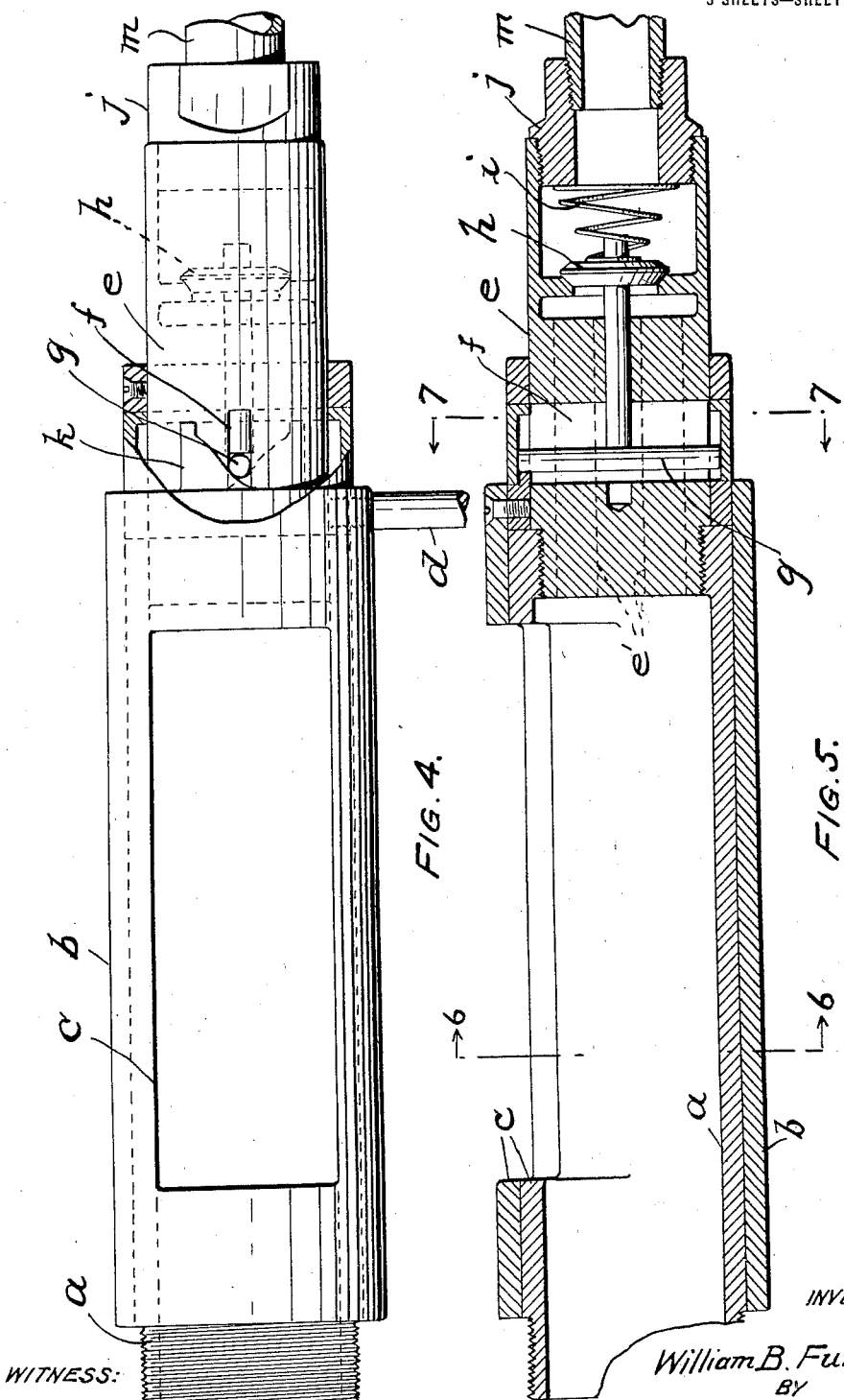

UNITED STATES PATENT OFFICE.

WILLIAM B. FURMAN, OF CHESTER, PENNSYLVANIA.

PNEUMATIC RIVET-PASSING APPARATUS.

1,385,820.   Specification of Letters Patent.   Patented July 26, 1921.

Application filed August 29, 1919. Serial No. 320,574.

*To all whom it may concern:*

Be it known that I, WILLIAM B. FURMAN, a citizen of the United States, residing at Chester, county of Delaware and State of Pennsylvania, have invented a new and useful Improvement in Pneumatic Rivet-Passing Apparatus, of which the following is a full, clear, and exact description, reference being had to the accompanying drawings, which form a part of this specification.

In riveting, especially in large structural work, such as ships, it is customary to employ two or more "passer boys" to convey rivets from the forge to the point of riveting. This involves considerable hand labor. Moreover, the rivets lose much of their heat during delivery, and if the loss of heat is substantial, the operation of riveting is relatively slow. Again, when a forge is located in the hold in any relatively confined space, as it often must be in order to bring it within reasonable distance of, and at a practicable position relatively to, the point of riveting, the gas, heat and dirt are disagreeable to every one working in the vicinity of the forge and often to the riveters themselves. Again, it is necessary for reasons above stated, to change the location of the forges from time to time, involving delay and expense.

It is known in the art to provide pneumatically operated means to convey rivets from the forge to the riveter and thereby save labor, and expedite the conveyance of the rivets, and thus enable the riveters to drive them hot; the known arrangement also permitting the forges to be located on the open deck and avoiding the necessity, in many cases, of removing the forge from one location to the other. The said arrangement includes a rivet conveying conduit, a compressed air supply conduit, rivet-despatching means between the two conduits which are operable to first allow the introduction to the rivet-conveying conduit of a rivet and then connect the two conduits, and a rivet receiver at the other end of the rivet-converging conduit. Such arrangements, although known, are not generally used.

The object of my invention is to substantially improve the mechanical construction of a rivet passing apparatus of this character and also to simplify and improve its mode of operation, thereby making practicable a wider use of the system. To this end I have devised a substantially novel despatcher and a substantially novel receiver.

A preferred embodiment of my invention, is shown in the accompanying drawings wherein, for the purpose of giving the fullest possible understanding of the construction, utility, mode of operation and manner of use of my invention, I have illustrated the entire rivet passing apparatus as well as general and detail views of the despatcher.

Figure 1 is a plan of the apparatus.

Fig. 2 is an elevation of the apparatus.

Fig. 3 is an enlarged cross section through the receiver.

Fig. 4 is a plan, partly in section, of the despatcher.

Fig. 5 is a longitudinal sectional view of the despatcher.

It will be observed that the principal elements of the apparatus are a closed conduit, a rivet despatcher at one end of the conduit and in which the hot rivet is deposited, and a rivet receiver at the other end, or terminus, of the conduit, together with a compressed air supply which is preferably connected with the forge as well as with the despatcher; the supply of air to the forge being controlled by a hand-valve and the supply of air to the rivet-passing apparatus being controlled automatically, preferably as hereinafter described.

The inner casing $a$ of the despatcher is within an outer casing $b$, the latter being turnable on the former on their common axis, the two casings having cut-away portions $c$ which register when the casing $b$ is turned to one position to permit the insertion of a rivet, and which are out of register when the casing $b$ is turned to another position, thereby closing the casing $a$. A handle $d$ is secured to the casing $b$ for turning the same.

To the air-admission end of the casing $a$ is secured a valve casing $e$ through which extend longitudinally air-channels $e'$. Casing $e$ is provided with a diametral slot $f$, into which extends a cross-pin $g$, the slot $f$ being long enough to allow the cross-piece $g$ to have a limited sliding movement in the direction of the axis of the casing. At the air-admission end of casing $e$ is a valve seat for a valve $h$, the stem of which extends forwardly into contact with the cross-pin $g$. A spring $i$ bears upon the head of the valve and tends to hold it closed. The other end of the spring bears against the end of a coupling $j$ connected with an air pipe $m$.

Secured to the turnable outer casing is an end cap provided with oppositely arranged cams $k$ which extend within the casing $e$ and which are adapted, as the casing $b$ is turned to close the despatcher, to bear against the cross-pin $g$ and move it toward the admission end of the casing, thereby forcing the valve $h$ off its seat and admitting air to the despatcher. When the casing is turned to open the despatcher, spring $i$ closes the valve, the cams $k$ turning to allow the valve stem to return the cross-pin $g$.

The pipe $m$ is connected, by a T-fitting, with an air-supply pipe $n$ and a pipe $o$ leading to the forge $r$. The pipe $o$ is provided with a hand-valve $p$.

The casing $a$ is connected, by a coupling $s$, with one end of the air-conduit $t$, which preferably is a flexible hose of indefinite length. The other end of the hose is connected by a coupling $u$, with the receiver. The receiver comprises an open-top cylindrical receptacle $v$ having threaded thereon end heads $w$ and $x$, the head $x$, or reducer, having a contracted outer end threaded to the coupling $u$. The receiver is provided with perforations $y$ in its bottom to permit scale from the rivets to fall therethrough.

Figure 9:
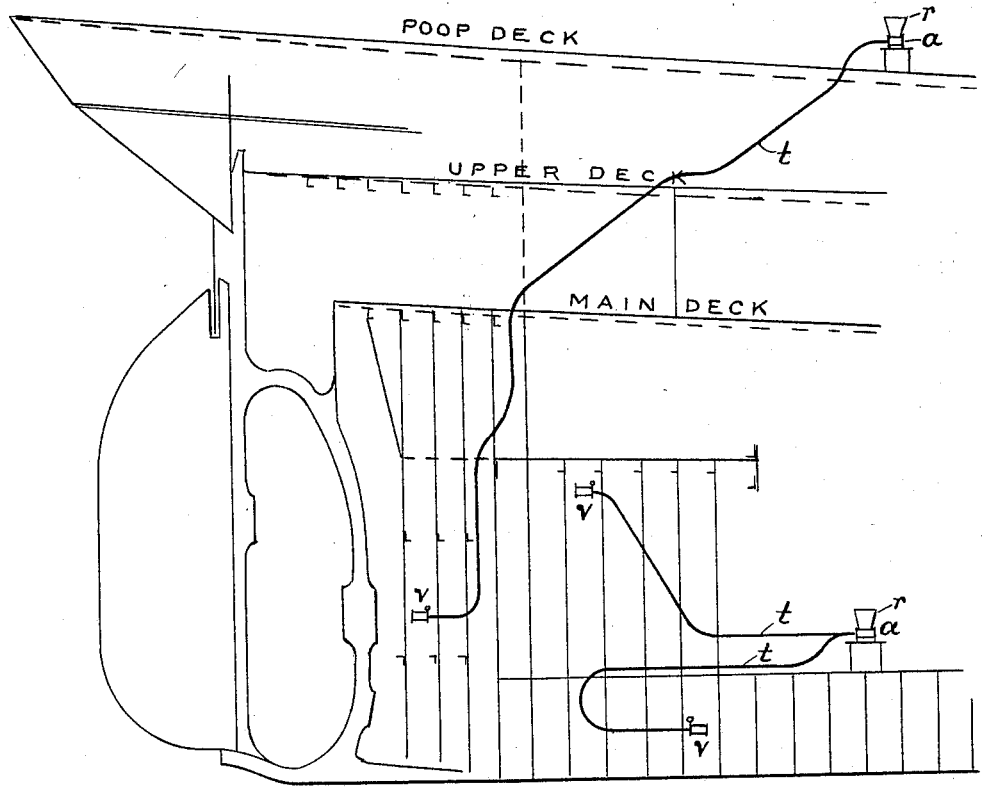
Fig. 9 is a diagram showing the application of the invention to a "tanker."
Figure 6:
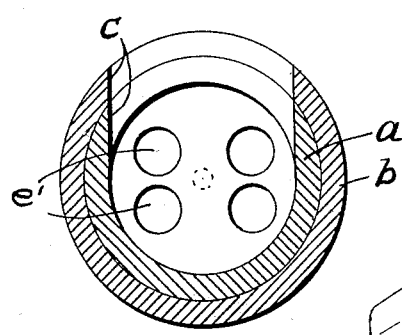
Fig. 6 is a section on the line 6—6 of Fig. 5.
Figure 7:
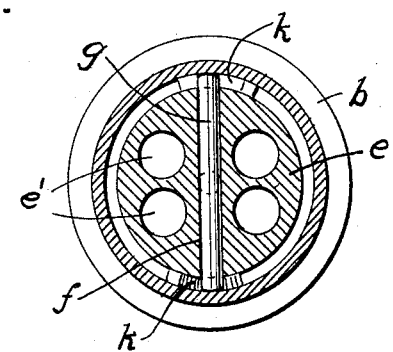
Fig. 7 is a section on the line 7—7 of Fig. 5.
Figure 8:
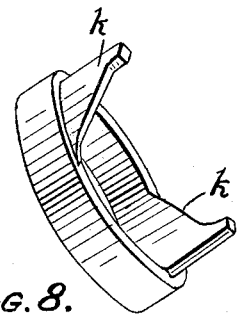
Fig. 8 is a detail perspective view of the valve-actuating cam.

In Fig. 9 is illustrated diagrammatically the application of the invention to an oil tanker. One forge $r$ and despatcher $a$ is located on the outer deck, while the connected receiver $v$ is located in the hold. Another forge $r$ and despatcher $b$ is located in the hold on the tank top, while the connected receiver is located inside the tank. These are merely illustrative of many possible arrangements.

The admission of compressed air to the forge or rivet heater is controlled, as hereinbefore described, by hand manipulation of the valve $p$. To transfer a rivet from the forge to the receiver, the hot rivet is dropped into the despatcher, the handle $d$ having been turned to open the despatcher and the spring $i$ holding closed the air-admission valve $h$. The handle $d$ is then turned to close the despatcher, the cam $k$ at the same time forcing open the valve $h$. Air under pressure immediately flows into the despatcher and propels the rivet through the hose $t$ to the receiver $v$.

The hot rivet will be delivered a distance of 50 feet in less than two seconds. The operator, after the delivery of the rivet, turns the handle in the opposite direction, thus opening the despatcher, and turning the cams $k$ into position to allow the spring $i$ to close the valve $h$.

The rivets lose no appreciable heat in the transfer, as they still sparkle when they reach the receiver after traveling through a considerable length of hose.

The head of the rivet may be of nearly the diameter of the hose $t$, or substantially smaller. In other words, rivets of different sizes may be delivered through the same hose.

The rivets may be propelled from the bottom of a structure to the top, or from the top to the bottom, or in any other direction.

The invention is of special utility in the delivery of rivets to the inner-bottom, coffer dams and all congested places in the hull of a ship.

Having now fully described my invention, what I claim and desire to protect by Letters Patent is:

1. In a rivet passing apparatus, the combination of a despatcher chamber adapted to receive a rivet, a compressed air supply conduit and a rivet-conveying conduit, both connected with said chamber, a closure for said chamber, a separate spring-actuated valve normally closing communication between the air supply conduit and said chamber, and means operatively connected with such closure and valve adapted to close said closure and open said valve, said valve automatically closing upon the opening of the closure.

2. In a rivet passing apparatus, the combination of a despatcher chamber adapted to receive a rivet, a compressed air supply conduit and a rivet-conveying conduit, both connected with said chamber, a closure for said chamber, a separate valve controlling communication between the air supply conduit and said chamber, a cam, adapted to be operated to actuate the valve, and means to coordinately actuate the closure and cam.

3. In a rivet passing apparatus, the combination of a despatcher chamber adapted to receive a rivet, a compressed air supply conduit and a rivet-conveying conduit, both connected with said chamber, a closure for said chamber, a separate spring-actuated valve normally closing communication between the air supply conduit and said chamber, a cam adapted to be operated to open the valve, and means connected with said closure and cam adapted in one movement to close the closure and move the cam to open the valve and in another movement to open the closure and move the cam to allow the valve to close.

4. In a rivet passing apparatus, the combination of a despatcher casing, a rivet-conveying conduit connected therewith, an air admission valve, a closure for the casing, a cam movable with the closure, a slidable member operable by the cam and adapted to operate the valve in one direction, and a spring adapted to operate the valve in the other direction.

5. A rivet passing apparatus comprising two concentric tubular casings having openings, one of said casings being turnable relatively to the other to bring the openings into and out of registry, a separate valve controlling the admission of compressed air to the inner tubular casing, and means to simultaneously turn the turnable casing and actuate the valve.

6. A rivet passing apparatus comprising a despatcher chamber, a valve chamber, a member separating said chambers and provided with air channels, a valve in the valve chamber and controlling the admission of compressed air through the valve chamber and said channels into the despatcher chamber, a closure for the despatcher chamber, and operative connections between the valve and the closure.

7. A rivet passing apparatus comprising a despatcher chamber, a valve chamber, a member separating said chambers and provided with air channels, a valve in the valve chamber and controlling the admission of compressed air through the valve chamber and said channels into the despatcher chamber, a closure for the despatcher chamber, and operative connections between the valve and the closure, said connections comprising devices axially slidable in said separating member.

8. A rivet passing apparatus comprising a despatcher chamber, a valve chamber, a member separating said chambers and provided with air channels, a valve in the valve chamber and controlling the admission of compressed air through the valve chamber and said channels into the despatcher chamber, a closure for the despatcher chamber, and operative connections between the valve and the closure, said connections comprising a turnable cam and an axially slidable member both positioned within said separating member.

9. A despatcher for a rivet passing apparatus, comprising two concentric casings having openings, one of said casings being turnable relatively to the other to bring the openings into and out of registry, a valve casing provided with an air passage, a valve seating on the valve casing and adapted to close the air passage, a crosspin slidable in the valve casing, a cam turning with the turnable casing and adapted, when such casing is turned in one direction, to slide the cross-pin and cause the latter to unseat the valve, and a spring adapted to seat the valve and return the cross pin as the turning of such casing in the opposite direction causes the cam to recede.

10. A rivet passing apparatus comprising a rivet conveying conduit, in combination with a receiver comprising a perforated receptacle and a reducer connecting such conduit and receptacle, the reducer flaring outward from the conduit toward the receptacle.

In testimony of which invention I have hereunto set my hand at Chester, Pa., on this 5th day of August, 1919.

WILLIAM B. FURMAN.